United States Patent
Johnson

[15] 3,672,275
[45] June 27, 1972

[54] PHOTOGRAPHIC APPARATUS FOR PROCESSING FILM MATERIAL

[72] Inventor: Bruce K. Johnson, Andover, Mass.
[73] Assignee: Polaroid Corporation, Cambridge, Mass.
[22] Filed: June 29, 1970
[21] Appl. No.: 50,381

[52] U.S. Cl. ...................................................95/13
[51] Int. Cl. .........................................G03b 17/50
[58] Field of Search.........................95/13, 14, 89 R

[56] References Cited

UNITED STATES PATENTS

| | | | |
|---|---|---|---|
| 3,327,599 | 6/1967 | Murphy | 95/13 |
| 3,165,040 | 1/1965 | Hamilton | 95/13 |
| 3,416,427 | 12/1968 | Murphy | 95/13 X |
| 2,543,180 | 2/1951 | Land | 95/13 |

Primary Examiner—Samuel S. Matthews
Assistant Examiner—Fred L. Braun
Attorney—Brown and Mikulka, David R. Thornton and William D. Roberson

[57] ABSTRACT

A photographic camera is provided with a narrow elongated slot in the housing wall through which film sheets are withdrawn, and includes margin guides which extend outwardly from a recessed medial portion of the exterior edges of the slot so as to guide and support the longitudinal margins of the film.

17 Claims, 4 Drawing Figures

PATENTED JUN 27 1972

INVENTOR.
BRUCE K. JOHNSON
BY Brown and Mikulka
and
David R. Thornton
ATTORNEYS

3,672,275

PHOTOGRAPHIC APPARATUS FOR PROCESSING FILM MATERIAL

BACKGROUND OF THE INVENTION

This invention relates to photographic apparatus and, more particularly, to photographic apparatus such as a camera which is adapted for processing and withdrawal of a film unit therefrom.

In photographic apparatus such as, for example, self-developing cameras, it is often desirable to withdraw one or more of the flexible film sheets from the apparatus without admission of excessive extraneous light to the housing interior and without excessive distortion of the film material. Hence, it is desirable to employ an opening or exit passage of minimum size, and to adequately guide the delicate film material as it is withdrawn from the apparatus.

It is an object of this invention to provide a photographic apparatus having an exit passage which guides and supports the film in a predetermined plane during its withdrawal from the housing of the apparatus.

It is another object of this invention to provide a photographic apparatus having an exit passage adapted to prevent forcing of the medial area of the film against exterior portions of the exit passage during its withdrawal.

It is a further object to provide a self-developing camera having an exit passage adapted to preclude scraping of the image-forming area of the film as it is withdrawn from the camera.

SUMMARY OF THE INVENTION

A photographic apparatus for spreading a processing fluid on a sheet-like material of predetermined width having a section thereof intermediate its longitudinal edges adapted to have an image formed therein, comprising: a substantially light-tight housing for enclosing such sheet-like material prior to its being treated with such fluid; first means for spreading such fluid onto such sheet-like material and for facilitating the withdrawal of such sheet-like material from said apparatus, said first means including second means for defining an elongated slot through which such sheet-like material may be withdrawn lengthwise from said housing; and third means on said apparatus for precluding scraping of such image forming section against said apparatus whenever such sheet-like material is withdrawn from said apparatus in a manner that a portion thereof exterior of said apparatus is disposed at an acute angle with respect to that portion thereof disposed within said slot.

BRIEF DESCRIPTION OF THE DRAWINGS

The novel features that are considered characteristic of the invention are set forth with particularity in the appended claims. The invention itself, however, both as to its organization and its method of operation, together with additional objects and advantages thereof, will best be understood from the following description of the preferred embodiment when read in connection with the accompanying drawings wherein like numbers have been employed in the different figures to denote the same parts and wherein:

DESCRIPTION OF THE PREFERRED EMBODIMENT

Figure 1:
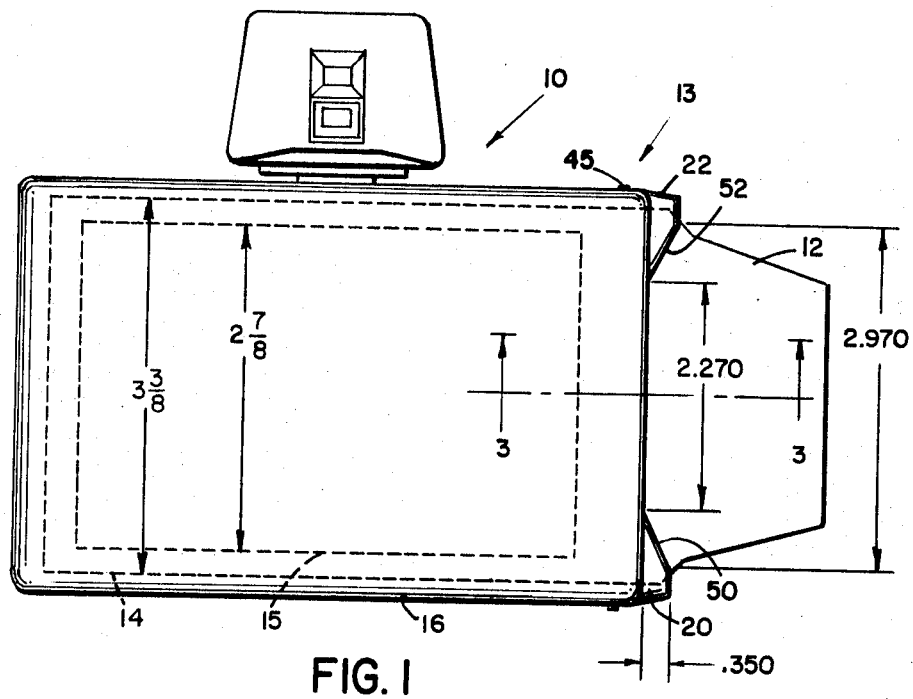
FIG. 1 is a rear view of a self-developing camera embodying the invention and showing the film leader extending from an exit passage at one end of the camera housing.
Figure 2:
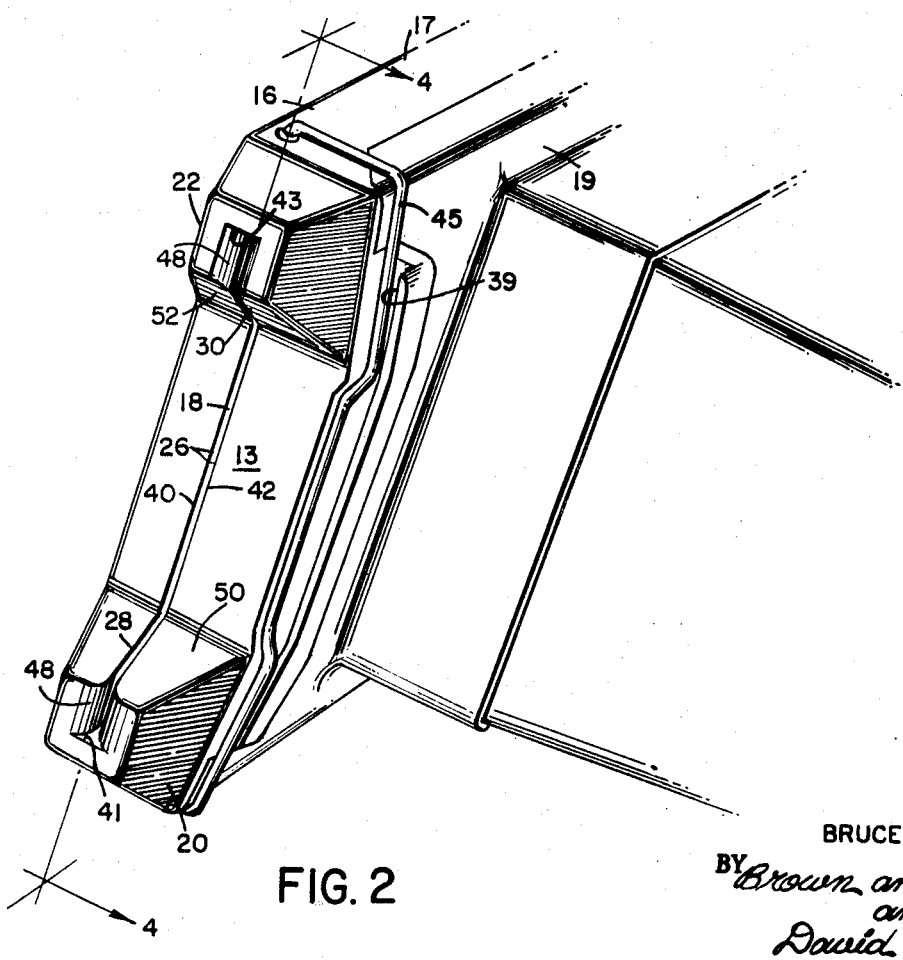
FIG. 2 is a fragmentary perspective view of the camera of FIG. 1 illustrating the contoured exterior of the exit passage.

FIG. 1 shows a self-developing camera 10 of plastic material, or the like, having a leader 12 of a flexible film unit 14 extended from one end of a film chamber 16. Leader 12 extends through an exit passage 18 shown, for reasons of clarity, without the film in FIG. 2. Passage 18 is a narrow elongated slot which passes through a castellated end wall 13 of chamber 16 such that passage 18 opens, in part, through a planar section 24 of wall 13 and through laterally spaced protuberances 20 and 22 of wall 13. Each of these protuberances include end portions of passage 18 which form lip-like margin guides 28 and 30 which are adapted to engage the longitudinal margins of film unit 14 as it is withdrawn from chamber 16.

In the preferred embodiment, end portions 20 and 22 protrude from end wall 24 and provide an indented or recessed medial area of the exterior edges 26 of passage 18, bounded at its lateral ends by margin guides 28 and 30. Hence, exterior edges 26 are generally U-shaped in the plane of the film so as to not only provide an indentation which facilitates grasping of leader 12, but more importantly, to support the film margins for a distance beyond the medial portion of the exterior edge which precludes scraping of the centrally located image-forming section 15 of film unit 14 against this edge or other portions of the housing. Scraping as used herein is intended to broadly include any bending or forceable contact against an edge and is not restricted to contact resulting in removal of surface material.

Figure 3:
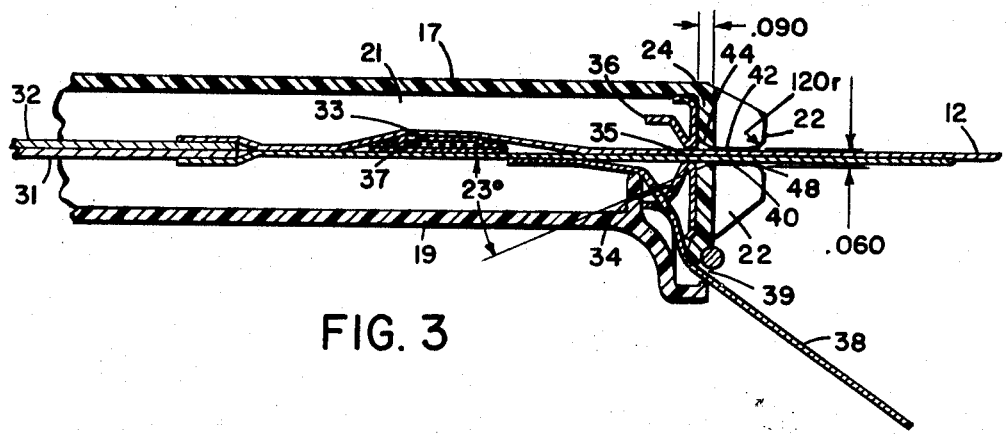
FIG. 3 is a fragmentary cross-sectional view of the camera taken along line 3—3 of FIG. 1.

Preferably, the novel exit passage is designed for incorporation in a self-developing camera such as described in U.S. Pat. No. 3,113,496, issued Dec. 10, 1963 in the name of W. H. Eburn, Jr., et al., in which film units are adapted to be exposed and subsequently processed as they are withdrawn from the camera body. This type of film unit, shown by way of example in FIG. 3, utilizes a photosensitive sheet 31 of film material which, following exposure, is adapted to be superposed with image-receiving sheet 32 and includes a rupturable pod or container 33 of processing fluid 37. As the superposed sheets 31 and 32 are withdrawn from camera 10, they pass between juxtaposed pressure applying members 34 and 36 which first effect a rupturing of pod 33, and subsequently, a spreading of fluid 37 in a layer between such superposed sheets. This facilitates the development of the latent image recorded in the photosensitive stratum of sheet 31 and the production of a visible image therefrom in sheet 32 by diffusion and transfer of reagents from the photosensitive stratum through the interposed fluid. For this purpose a spreader system, such as a conventional roller arrangement described in U.S. Pat. No. 3,113,496, or non-rolling rigid members such as described in copending application Ser. No. 655,835, filed July 25, 1967, now U.S. Pat. No. 3,498,196 in the name of Patrick L. Finelli, may be employed to rupture the pod container and uniformly spread the fluid between the film sheets as they are withdrawn from the camera. For example, as shown in FIG. 3, a pair of non-rolling spreader members 34 and 36 may be disposed within chamber 16 adjacent passage 18 so as to provide a narrow pressure generating gap 35 which is aligned with passage 18. Pressure gap 35 provides the compressive means through which sheets 31 and 32 are advanced lengthwise in superposition to effect the spreading of fluid 37 therebetween.

In the preferred embodiment, chamber 16 is formed by a rear section 17 hingedly mounted (not shown) to a forward section 19 of the camera body, and clamped thereto by a wire clamp 45 or the like to form a substantially light-tight chamber 16 for containing a film pack in position for processing. In this embodiment, passage 18 is disposed wholly within rear section 17, however, it should be understood that passage 18 may be incorporated in a disposable film magazine or the like which is adapted to be releasably affixed to the camera body and may, of course, be employed in other photographic apparatus.

Figure 4:
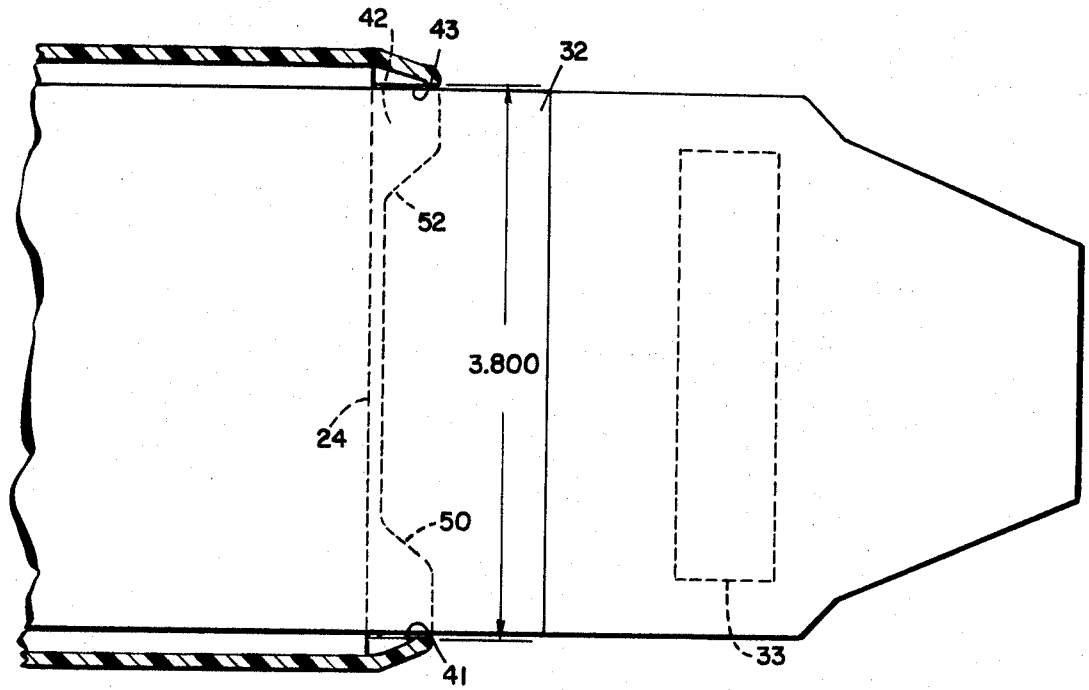
FIG. 4 is a fragmentary view of the camera taken along line 4—4 of FIG. 2 and showing the position of the film at one point during its withdrawal.

In a typical camera of this type, after exposure of sheet 31, leader 12 is extended through passage 18, as shown in FIG. 3 by drawing a conventional film tab 38 through its exit port 39, which positions pod 33 adjacent spreader members 34 and 36 such that film unit 14 is now ready for processing. This is accomplished by grasping leader 12 and pulling film unit 14 through the spreader system and exit passage 18. As film unit 14 moves through exit passage 18, it is supported in the plane of gap 35 by lip-like margin guides 28 and 30 as illustrated in FIG. 4.

In the novel structure, passage 18 is defined by a pair of generally U-shaped facing surfaces 40 and 42 joined along each lateral edge by end walls 41 and 43. Surfaces 40 and 42 are spaced apart a distance slightly exceeding the maximum thickness of film unit 14 so as to provide a substantially light-tight chamber, and are aligned parallel to spreader gap 35 so as to support the film in the plane of this gap. That is, passage 18 and particularly the margin portions thereof, substantially precludes deviation from the desired plane of movement of the film as it proceeds through the spreader members. This is of particular importance with spreader members, as shown, which employ contact edges of relatively small radius.

In this embodiment, the interior edges of surfaces 40 and 42 are inclined towards the film plane, as shown at 44 in FIG. 3, to provide a converging angle which funnels, or that is, introduces leader 12 and its following superposed film sheets 31 and 32 into passage 18. Additionally, the outermost edges 48 of lip-like guides 28 and 30 are divergently curved out of the exit plane to prevent sharp bending of the film if the portion exterior to the housing is inadvertently pulled in a plane other than the predetermined exit plane defined by passage 18.

To avoid any possible scraping of image section 15, that is, its being drawn over a sharp edge which can cause deleterious effects such as sharp bending or movement between the superposed film sheets, protuberances 20 and 22 are laterally spaced apart a distance approximately equal to or slightly exceeding the image area of the film. Moreover, the facing sides 50 and 52 of protuberances 20 and 22 which form side walls of the recess, are inclined away from each other so as to laterally diverge. That is, sides 50 and 52 form an acute angle with the bottom of the recess, for example, 45° and provide a gradual widening of the recess, or lateral divergence of the lip-like guides 28 and 30 in the direction of movement of the film. Advantageously, inclined sides 50 and 52 are laterally spaced at their closest or innermost end, a distance less than the image width and at their outermost end, a distance slightly exceeding the image width so that the lip edges, which bound the recess, diverge to a maximum recess width slightly exceeding the image width. Hence, this provides maximum margin support while reducing the possibility of forcing the image area against exterior edge 26. To avoid scraping only a shallow recess, for example, one-sixteenth deep, would be suitable, however, since the length of the passage or, that is, the length of lips 28 and 30 in this embodiment reduces deviation from the desired plane of movement of the film, the lips are extended approximately three-eighth inch in the preferred embodiment. Although end walls 41 and 43 of passage 18 are not absolutely necessary for film guiding, they do limit extreme sidewise movement of the film and hence tend to retain image-forming section 15 over the recess if the film is inadvertently drawn to the side.

Certain dimensions have been indicated on FIGS. 1, 3, and 4 in order to impart a full understanding of the present invention. However, it is to be expressly understood that these dimensions are exemplary only and are not to be interpreted as restricting the scope of applicant's invention in any manner.

Many different modifications are possible, of course, for example, the indented contour of the passage exterior may be formed inwardly of the housing. Additionally, the facing surfaces which support the film need not form full platform-like areas in the margin lips but merely be relatively thin supports formed by extending the slot through a contoured wall or the like. Moreover, although the novel exit aperture is preferably mounted wholly within a displaceable rear section of the camera, many other arrangements are possible. For example, the rear section of the camera, or a releasably mounted magazine, may contain only part of the slot forming surfaces such that the complete passage is formed by cooperation between the rear section and the camera housing.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. A self-developing camera for spreading a processing fluid on sheet-like material of a predetermined width having a section thereof intermediate its longitudinal edges adapted to have an image formed therein, comprising:

an enclosed substantially light-tight chamber having an elongated slot through which such sheet-like material may be withdrawn from said camera after such fluid has been spread thereon;

means within said chamber for spreading such fluid on such sheet-like material; and means on said camera adjacent the exterior of said slot for precluding scraping of such image-forming section of such sheet-like material against the exterior edges of said slot whenever such sheet-like material is withdrawn from said camera in a direction tending to cause such sheet-like material to assume an angle with respect to that portion thereof still disposed within said slot, said scraping precluding means being configured so as not to scrape against such image-forming section at such time.

2. The camera of claim 1 wherein said precluding means include means for engaging respective longitudinal margins of such sheet-like material on either side of such image-forming section.

3. The camera of claim 1 wherein the interior elongated edges of said slot are inclined toward each other so as to introduce such sheet-like material therein.

4. The camera of claim 1 wherein such sheet-like material includes a pair of sheet-like materials of such predetermined width, said spreading means include means for forming an elongated pressure-generating gap through which such materials may be advanced lengthwise in superposition to effect the spreading of such fluid therebetween, and said slot is aligned with said gap for supporting such sheet-like materials in the plane defined by said gap.

5. A self-developing camera for spreading a processing fluid on sheet-like material of a predetermined width having a section thereof intermediate its longitudinal edges adapted to have an image formed therein, comprising:

an enclosed substantially light-tight chamber having an elongated slot through which such sheet-like material may be withdrawn from said apparatus after such fluid has been spread thereon;

means within said chamber for spreading such fluid on such sheet-like material; and means formed on said camera for precluding such image-forming section of such sheet-like material from being scraped against said camera whenever such sheet-like material is withdrawn therefrom in a direction tending to cause such sheet-like material to assume an angle with respect to that portion thereof still disposed within said slot, said scraping precluding means including a proturberance extended a predetermined distance from the wall of said chamber at each lateral end of said slot for forming generally U-shaped exterior edges of said slot which provide a recessed medial portion of said exterior edges and laterally spaced end portions thereof for engaging longitudinal marginal portions of such sheet-like material for a distance beyond said medial portion.

6. The camera of claim 5 wherein said end portions include lip-like surfaces, and the exterior edges of said lip-like surfaces are divergently curved for imparting a curvature to such marginal portions of such sheet-like material during withdrawal of such exterior portion thereof at an acute angle to sheet portions within said slot.

7. The camera of claim 5 wherein said protuberances are laterally spaced apart a distance approximately equal to the lateral dimension of such image-forming section.

8. The camera of claim 5 wherein facing sides of said protuberances are inclined away from each other and disposed at an acute angle to the bottom surface of the recess formed therebetween so as to provide a gradual widening of said marginal engaging portions in the direction of movement of such sheet-like material during its withdrawal from said chamber.

9. The camera of claim 8 wherein said facing sides are spaced apart a predetermined distance such that at the innermost end of said recess they are spaced less than the lateral dimension of such image-forming section and at the outermost end of said recess they are spaced slightly greater than the lateral dimension of such image-forming section.

10. The camera of claim 8 wherein said end portions provide lip-like facing surfaces extending laterally from said facing sides to the lateral ends of said slot.

11. Photographic apparatus for spreading a processing fluid on sheet-like material of predetermined width having a section thereof intermediate its longitudinal edges adapted to have an image formed therein, said apparatus including a substantially light-tight housing in which such sheet-like material may be disposed prior to its being treated with such fluid, comprising:
first means for spreading such fluid onto at least such image-forming section of such sheet-like material and for facilitating the withdrawal of such sheet-like material from said apparatus, said first means including second means for defining an elongated slot through which such sheet-like material may be withdrawn lengthwise from said housing; and
third means on said apparatus adjacent the exterior of said slot for precluding scraping of such image-forming section of such sheet-like material against the exterior edges of said slot and said third means whenever such sheet-like material is withdrawn from said apparatus in a direction tending to cause such sheet-like material to assume an angle with respect to that portion thereof still disposed within said slot.

12. The apparatus of claim 11 wherein said third means include means for engaging respective longitudinal marginal portions of such sheet-like material on either side of such image-forming section.

13. Photographic apparatus for spreading a processing fluid on sheet-like material of predetermined width having a section thereof intermediate its longitudinal edges adapted to have an image formed therein, comprising:
an enclosed substantially light-tight chamber having an elongated slot through which such sheet-like material may be withdrawn from said apparatus after such fluid has been spread thereon;
means within said chamber for spreading such fluid on such sheet-like material; and
means on said apparatus adjacent the exterior of said slot for precluding scraping of such image-forming section of such sheet-like material against the exterior edges of said slot whenever such sheet-like material is withdrawn from said apparatus in a direction tending to cause such sheet-like material to assume an angle with respect to that portion thereof still disposed within said slot, said scraping precluding means being configured so as not to scrape against such image-forming section at such time.

14. Photographic apparatus for spreading a processing fluid on sheet-like material of predetermined width having a section thereof intermediate its longitudinal edges adapted to have an image formed therein, comprising:
an enclosed substantially light-tight chamber having an elongated slot through which such sheet-like material may be withdrawn from said apparatus after such fluid has been spread thereon;
means within said chamber for spreading such fluid on such sheet-like material; and
means on said apparatus for precluding such image forming section of such sheet-like material from being scraped against said apparatus whenever such sheet-like material is withdrawn therefrom in a direction tending to cause such sheet-like material to assume an angle with respect to that portion thereof still disposed within said slot, said slot extending through a wall of said chamber having a generally U-shaped exterior contour such that exterior edges of said slot include a recessed medial portion and laterally spaced end portions extended therefrom for engaging respective longitudinal marginal portions of such sheet-like material thereby precluding scraping of such image-forming section of such sheet-like material against said apparatus.

15. The apparatus of claim 14 wherein said laterally spaced end portions are inclined laterally away from each other so as to form a gradually widening recess in the direction of movement of such sheet-like material through said slot.

16. The apparatus of claim 15 wherein said end portions are spaced apart a distance such that at the innermost end of said recess they are spaced less than the lateral dimension of such image-forming section and at the outermost end of said recess, they are spaced a distance slightly greater than the lateral dimension of said image-forming section.

17. A self-developing camera for spreading a processing fluid on sheet-like material of predetermined width having a section thereof intermediate its longitudinal edges adapted to have an image formed therein, comprising:
a chamber having an elongated slot through which such sheet-like material may be withdrawn after such fluid has been spread thereon;
means within said chamber for spreading such fluid on such sheet-like material as it is withdrawn from said slot;
means on said camera adjacent the exterior of said slot for controlling the plane of advancement of such sheet-like material through said slot and for precluding scraping of such image-forming section against said controlling means or exterior edges of said slot whenever such sheet-like material is withdrawn in a direction tending to cause such material to assume an angle with respect to said plane of advancement.

* * * * *